United States Patent
Jebens

(10) Patent No.: US 6,577,426 B1
(45) Date of Patent: Jun. 10, 2003

(54) OPTICAL ARRANGEMENT FOR FULL DUPLEX FREE SPACE INFRARED TRANSMISSION

(75) Inventor: Robert W. Jebens, Skillman, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/723,732

(22) Filed: Sep. 30, 1996

(51) Int. Cl.[7] ............................................... H04B 10/00
(52) U.S. Cl. ...................................... 359/172; 359/152
(58) Field of Search ................................ 359/152, 153, 359/159, 172

(56) References Cited

U.S. PATENT DOCUMENTS

| | | | | | |
|---|---|---|---|---|---|
| 4,573,214 | A | * | 2/1986 | Mooradian | 359/172 |
| 4,603,975 | A | * | 8/1986 | Cinzori | 356/152 |
| 4,867,560 | A | * | 9/1989 | Kunitsugu | 356/152 |
| 5,087,982 | A | * | 2/1992 | Smothers | 359/172 |
| 5,142,400 | A | * | 8/1992 | Solinsky | 359/172 |
| 5,253,095 | A | * | 10/1993 | Menadier et al. | 359/172 |
| 5,774,247 | A | * | 6/1998 | Taglione et al. | 359/172 |

* cited by examiner

*Primary Examiner*—John Tweel

(57) ABSTRACT

An optical device for full duplex free space light transmission comprises a transmitting light source, having a transmitting optical axis and a radiated beam, and a receiving light detector having a receiving optical axis and a field of view. The transmitting optical axis and the receiving optical axis are nonparallel and substantially in the same plane.

20 Claims, 1 Drawing Sheet

OPTICAL ARRANGEMENT FOR FULL DUPLEX FREE SPACE INFRARED TRANSMISSION

CROSS REFERENCES TO RELATED APPLICATIONS

This application is related to U.S. patent application Ser. No. 08/762,552, entitled "High Efficiency Resonant Network Drive For An Infrared LED" filed on Dec. 9, 1996, having a common assignee and a common inventor.

FIELD OF THE INVENTION

This invention relates generally to infrared devices, and more particularly to a device for full duplex infrared communications.

BACKGROUND OF THE INVENTION

Current Infrared Data Association (IRDA) products and other infrared products such as wireless headphones, which utilize scatter light from room surfaces, provide half duplex (one way) communications. Attempts to provide full duplex operation in general fail because of overload and intermodulation of the receiver while the transmitter is operating. This occurs even though the transmitter and receiver operate at different carrier frequencies (not different light wavelengths). When an object which reflects some light is nearby, such as a hand, very large amounts of transmitted light can be returned to the receiver.

It is desirable to consider a form of FM modulation on a carrier as a modulation scheme rather than a base band modulation scheme. While IRDA devices use base band modulation, the devices relate to line of sight applications with only a meter range. Here considerable optical gain can be utilized at the transmitter and receiver with only a thirty degree field of view requirement.

In normal noisy room environments, for instance, solid state ballasted florescent lighting, there is a huge light noise background. This is very intense at low frequencies since the ballast switching frequency is approximately 20 kHz which generates 40 kHz light noise with a high harmonic content. The intensity of noise is greatly decreased at approximately 300 or 400 kHz. In this frequency band, noise spikes occur every 20 kHz having a fine structure of two lines spaced about 2 kHz apart with finer noise lines on either side occurring every 120 Hz. In addition, each light fixture is not synchronized in frequency so that by the tenth harmonic, noise lines may be almost anywhere. With that type of ambient light noise background, the issue of photodiode shot noise and receiver front end noise become relatively less important for free space communications using scattered light. The transmitted light power has to be high enough so that at the receiver the desired signal and not the noise captures the FM limiter-discriminator. This in principle could be helped by using a spread spectrum approach, however spread spectrum circuitry uses up power which could be traded off for increased transmitted light power, which would accomplish a similar effect. Utilizing a much higher frequency to get above the noise harmonics is limited by the LED efficiency and the capacitive reactance of the photodiode. At higher frequencies the input stage noise level of the receiver and the photodiode shot noise due to ambient light intensity become increasingly more important.

Therefore, there is a need for an efficient full duplex infrared arrangement which minimizes transmitted light getting back into the receiver of the same device and reduces noise due to ambient light.

SUMMARY OF THE INVENTION

In accordance with the present invention, there is provided an optical device for full duplex free space light transmission. The optical device comprises a transmitting light source, having a transmitting optical axis and a radiated beam, and a receiving light detector having a receiving optical axis and a field of view. The transmitting optical axis and the receiving optical axis are nonparallel and substantially in the same plane.

BRIEF DESCRIPTION OF THE DRAWINGS

A more complete understanding of the present invention may be obtained from consideration of the following description in conjunction with the drawing in which.

DETAILED DESCRIPTION OF VARIOUS ILLUSTRATIVE EMBODIMENTS

Figure 1:
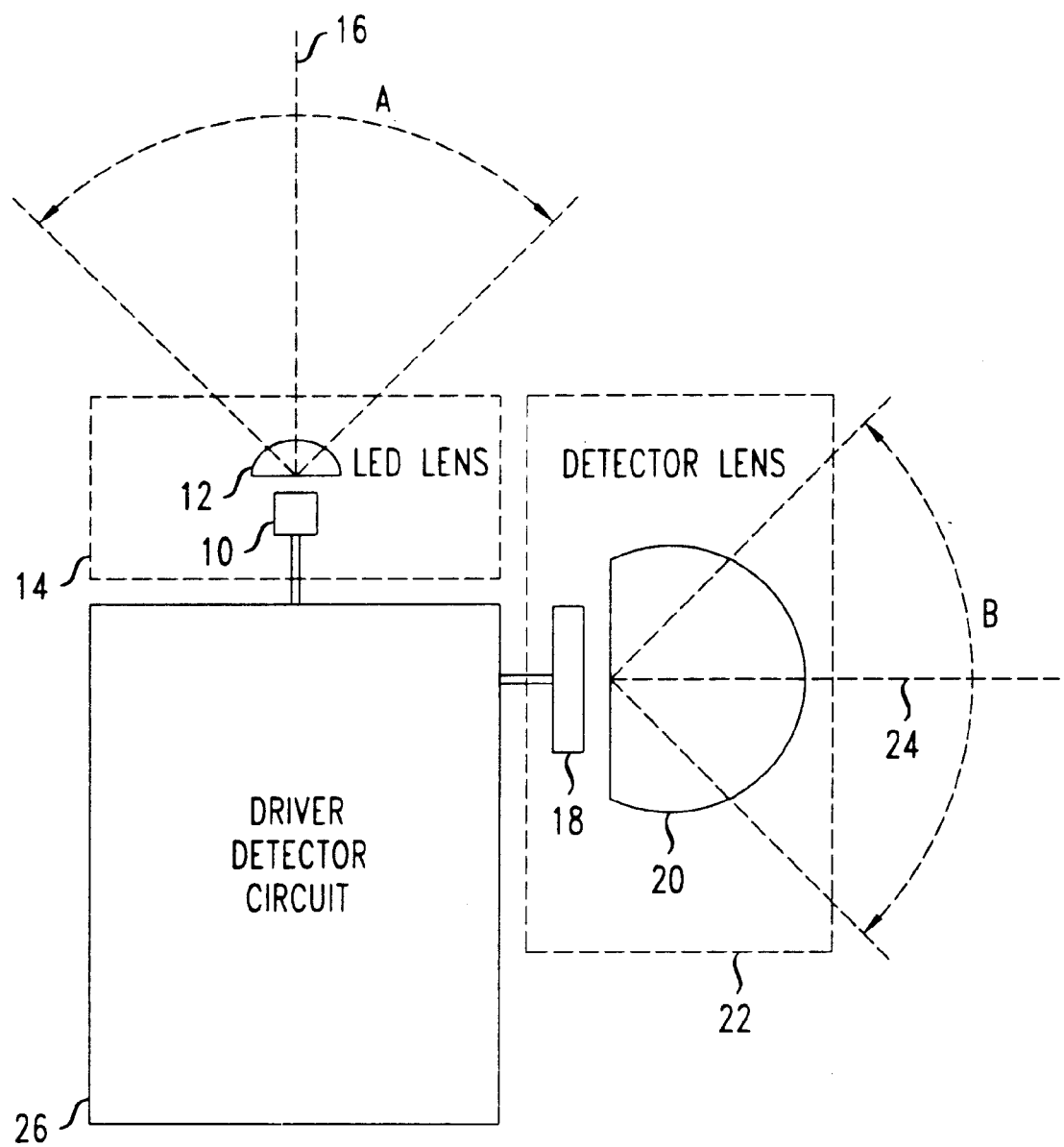
FIG. 1 is an illustration of the present invention an optical arrangement for full duplex free space infrared transmission.

Although the present invention is particularly well suited for use with infrared LEDs and photodiodes, and shall be described with respect to this application, the methods and apparatus disclosed here can be applied to other light transmitting and receiving devices equally as well.

Referring to FIG. 1 there is shown an illustration of the present invention an optical arrangement for full duplex free space infrared transmission. A transmitting LED 10 (light source) is centrally aligned with an immersion lens 12 forming an LED lens combination 14. The LED lens combination 14 has a centrally located transmitting optical axis 16 and defines a radiated beam angle A. A receiving photodiode array 18 (light detector) is centrally aligned with an immersion lens 20 forming a detector lens combination 22. The detector lens combination 22 has a centrally located optical axis 24 and defines a field of view angle B. A driver detector circuit 26 is coupled to the transmitting LED 10 and the receiving photodiode array 18. The driver detector circuit 26 provides the circuitry for modulating and driving the transmitting LED 10 as well as provides the circuitry for detecting and demodulating the signal received by the receiving photodiode array 18. While the present invention is particularly well suited for use with FM modulation, it is equally well suited to other forms of light modulation.

The optical arrangement for each full duplex unit consists of having the transmitting optical axis 16 and the receiving optical axis 24 at roughly right or larger angles and having both aligned approximately horizontal. The radiated beam angle A from the LED lens combination 14 is made to be fairly broad, on the order of 80 degrees beam width for half intensity. In a complementary fashion, the field of view angle B for the detector lens combination 22 is relatively narrow. This arrangement not only reduces problems greatly due to the receiving photodiode array 18 seeing reflected light from the transmitting LED 10, but also reduces spurious signals and noise. The detector lens combination 22 can not see scattered reflecting light from the transmitting LED 10 off of a plane surface. Even in double scattering such as off of a corner of a room the broad width of the radiated beam angle A of the LED lens combination 14 insures a relatively low intensity at the second surface. Since the field of view angle B of the detector lens combination 22 is more narrow only a small fraction of the transmitted energy is reaches the receiving photodiode array 18.

In one representative embodiment, the receiving photodiode array 18 consisted of four BWP34FA photodiodes configured in a square array with overhead florescent lighting and a white table surface below, a receiving immersion lens 20 with a narrower field of view gave appreciably better signal to noise due to the decreased ambient light intensity seen by the photodiodes. A one inch transparent Lucite® (thermoplastic arcylic resin) ball with one quarter of an inch machined off forms an immersion lens with an optical gain for a source at infinity of about 4.1. This appears to be a rough optimum compared to a one inch hemisphere with an optical gain of two and a wide field of view. The 80 degree extreme limit of view chosen for the receiving photodiode array 18 illuminated by the truncated spherical immersion lens was chosen after qualitative experiments which result in the following observations. Overhead lighting such as florescent light fixtures are often designed so that a person can not see the direct source of light when the viewing angle is greater than 45 degrees from the vertical. If the angle that the receiving photodiode array 18 can detect any light is limited to 40 degrees from the horizontal then the intensity of light seen by direct radiation from an ambient overhead light source is reduced both because of the design of typical light fixtures but also due to the greater path length to the source. The extreme ray entering the receiving immersion lens 20 only illuminates a tiny area of the receiving photodiode array 18 and that the solid angle where the whole array is illuminated is considerably smaller than 80 degrees. In a similar fashion, if the detector lens combination 22 is over a white scattering surface, such as white Formica® (highpressure laminated plastic sheets of melamine and phenolic materials), a narrow field of view reduces light from overhead light sources. This design aspect reduces noise due to the shot noise from light intensity and also light noise. Solid state ballasted florescent lights are one of the strongest sources of light noise typically producing 40 kHz noise harmonics beyond 500 kHz and these are usually in over head locations.

The field of view angle B of the detector lens combination 22 should be as large as possible consistent with the above considerations. This is due to the results of pointing the lens directly at a light source or a low reflectivity area. In the first case a high noise level results and the second case results in a small signal. These effects become quite bothersome when the optical gain for a distant source becomes much larger than a factor of four. The combined total field of view required of the combination of the transmitter and the receiver is a little less than 180 degrees. This design choice was selected because of the difficulty of getting a larger field of view with hands holding a piece of portable equipment.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. An optical device for full duplex free space light transmission comprising:
    a transmitting light source having a transmitting optical axis and a radiated beam, said radiated beam having a region of half intensity;
    a receiving light detector having a receiving optical axis and a field of view;
    wherein said transmitting optical axis and said receiving optical axis are nonparallel and substantially in the same plane such that said region of half intensity and said field of view are mutually exclusive in free space, enabling duplex operation of said transmitting light source and said receiving light detector.

2. The device as recited in claim 1 wherein said transmitting light source is an LED.

3. The device as recited in claim 1 wherein said receiving light detector is at least one photodiode.

4. The device as recited in claim 2 wherein said transmitting light source further comprises an immersion lens.

5. The device as recited in claim 3 wherein said receiving light detector further comprises an immersion lens.

6. The device as recited in claim 1 wherein said light source produces an infrared emission.

7. The device as recited in claim 1 wherein said radiated beam has a half intensity of at least 80 degrees.

8. The device as recited in claim 1 wherein said field of view is smaller than 80 degrees.

9. The device as recited in claim 1 wherein said light detector is limited to detect light at a source angle of 40 degrees or less from the horizontal.

10. An optical device for full duplex free space light transmission comprising:
    a transmitting light source having a transmitting optical axis and a radiated beam, said radiated beam having a region of half intensity;
    a receiving light detector having a receiving optical axis and a field of view;
    wherein said radiated beam and said field of view are nonoverlapping and said transmitting optical axis and said receiving optical axis are substantially in the same plane, enabling duplex operation of said transmitting light source and said receiving light detector.

11. The device as recited in claim 10 wherein said transmitting light source is an LED.

12. The device as recited in claim 10 wherein said receiving light detector is at least one photodiode.

13. The device as recited in claim 11 wherein said transmitting light source further comprises an immersion lens.

14. The device as recited in claim 12 wherein said receiving light detector further comprises an immersion lens.

15. The device as recited in claim 10 wherein said light source produces an infrared emission.

16. The device as recited in claim 10 wherein said radiated beam has a half intensity of at least 80 degrees.

17. The device as recited in claim 10 wherein said field of view is smaller than 80 degrees.

18. The device as recited in claim 10 wherein said light detector is limited to detect light at a source angle of 40 degrees or less from the horizontal.

19. The device as recited in claim 1 wherein said transmitting optical axis and said receiving optical axis are approximately at least at a right angle.

20. The device as recited in claim 10 wherein said transmitting optical axis and said receiving optical axis are approximately at least at a right angle.

* * * * *